C. H. WILLIAMS.
SAFETY HANGER SUPPORT FOR BRAKE BEAMS.
APPLICATION FILED JULY 13, 1916.
1,199,955.
Patented Oct. 3, 1916.
2 SHEETS—SHEET 1.
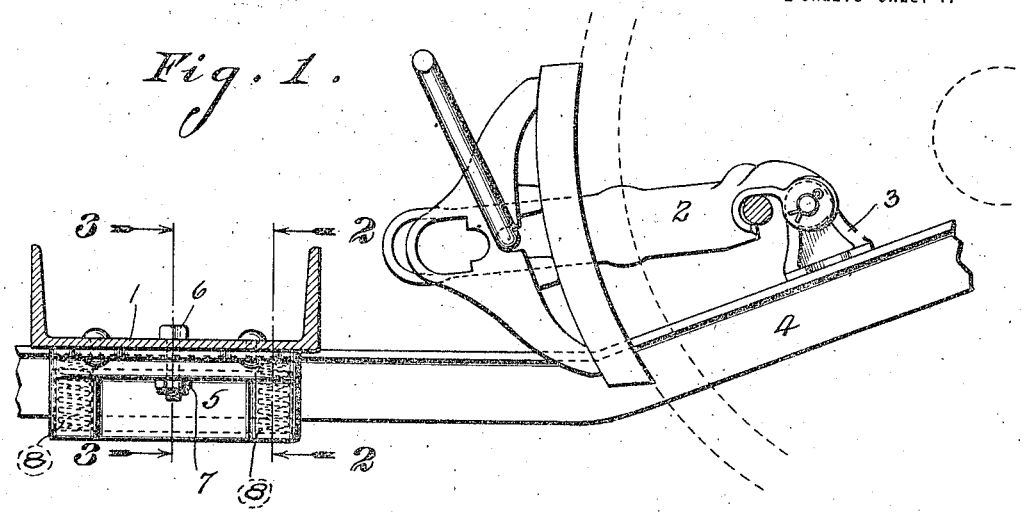
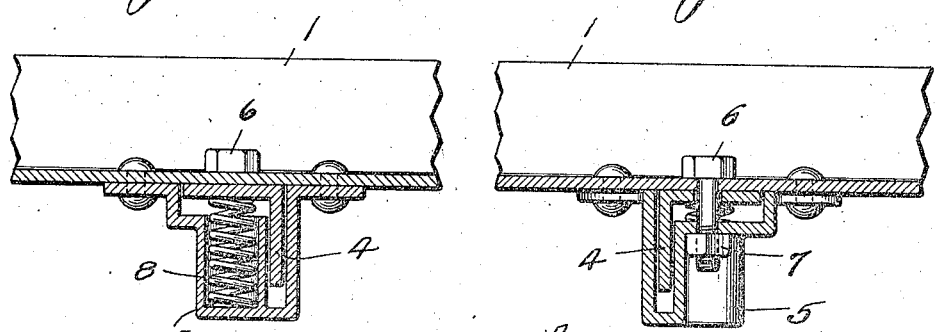
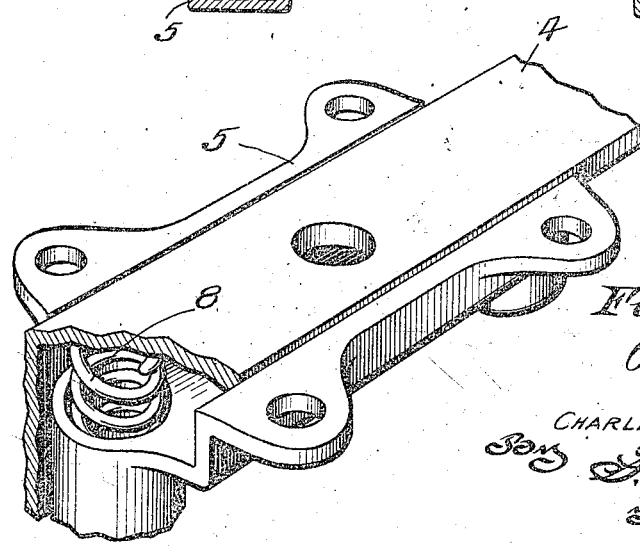
Inventor:
CHARLES HAINES WILLIAMS,

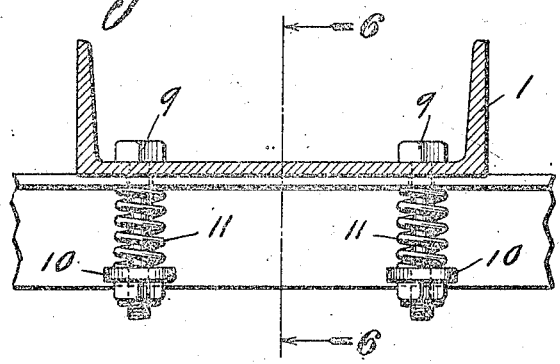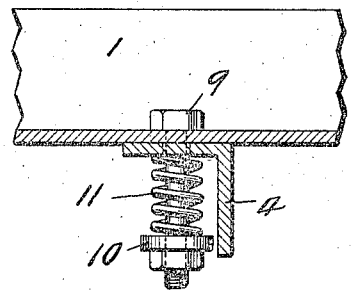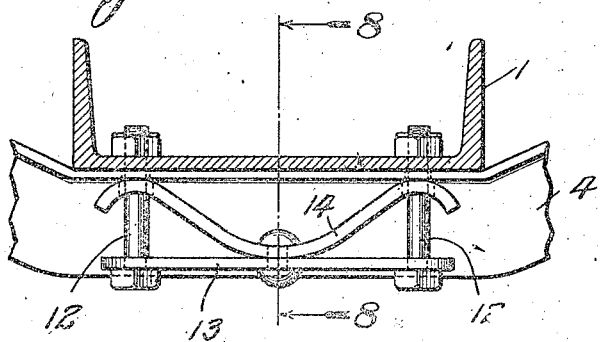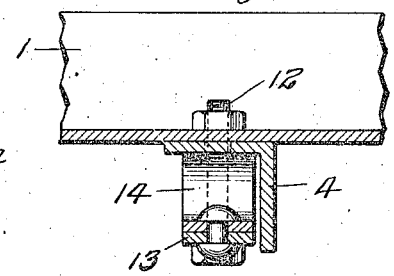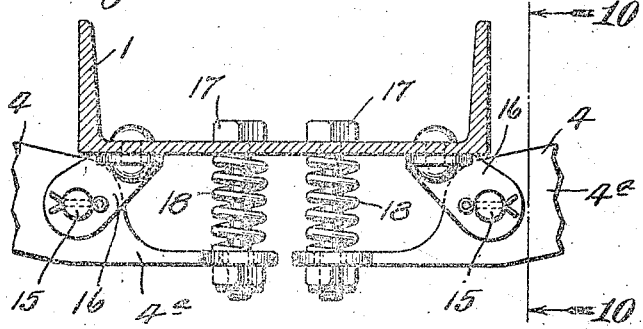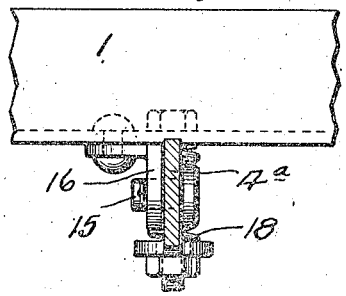

UNITED STATES PATENT OFFICE.

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SAFETY-HANGER SUPPORT FOR BRAKE-BEAMS.

1,199,955.

Specification of Letters Patent.     Patented Oct. 3, 1916.

Application filed July 13, 1916. Serial No. 109,139.

*To all whom it may concern:*

Be it known that I, CHARLES HAINES WILLIAMS, a citizen of the United States, residing at city of Chicago, county of Cook, and State of Illinois, have invented a certain new and useful Improvement in Safety-Hanger Supports for Brake-Beams, of which the following is a full, clear, and exact description, such as will enable others skilled in the art to which it appertains to make and use the same, reference being had to the accompanying drawings, forming part of this specification, in which—

Figure 1 is a side elevational view of one form of my invention. Fig. 2 is a sectional view on line 2—2 of Fig. 1. Fig. 3 is a sectional view on line 3—3 of Fig. 1. Fig. 4 is a detail view of the supporting bracket. Fig. 5 is a side elevational view of a modified form of my invention. Fig. 6 is a sectional view on line 6—6 of Fig. 5. Fig. 7 is a side elevational view of another modified form of my invention. Fig. 8 is a sectional view on line 8—8 of Fig. 7. Fig. 9 is a side elevational view of another modified form of my invention. Fig. 10 is a sectional view on line 10—10 of Fig. 9.

This invention relates to safety hanger supports for brake beams, but it is also useful in connection with sliding third and fourth point supports. Supports of this character have heretofore been made of light spring bars, but to get the proper resiliency and flexibility, the bars have sometimes proven in service to be too light and in consequence they have been bent so as to take a permanent set which impairs their efficiency, especially when used as third or fourth point supports.

It is the purpose of my present invention to make the hanger or support, as the case may be, of strong material which in itself is practically non-resilient or non-flexible, and to employ springs to give to this stiff bar or support the necessary flexibility. I am also enabled by this arrangement to use angles or T bars, I beams, etc., shapes which in themselves are strong and unbending and which, after being flexed, will return to their normal positions.

In the accompanying drawings, I have shown several arrangements of springs, such as a single heavy spring at the center, or two springs. This will allow one side of the bar to go down while the other goes up, which gives the desirable results corresponding to the action of shoes and beams on inside hung brakes where the bar is used as a third or fourth point support. The bar may be in one piece, as shown in Figs. 1 to 5, or divided at the center, as shown in Fig. 9.

In the drawings, 1 indicates the spring plank of the truck.

2 is a brake beam having a third point supporting shoe 3 at its inner end.

4 is an angle bar serving as a track plate for the third point support.

5 is a bracket casting secured to the underside of the spring plank and formed with a channel or recess therethrough for receiving the bar 4 and permitting a rocking movement of said bar or angle therein.

6 is a bolt passing through spring plank 1, bracket 5, and also through an enlarged opening in the bar 4, whereby said bar is held against longitudinal displacement, but is permitted to rock. Nut 7 is on the lower end of this bolt, which nut may be held in position by a cotter pin.

8 are springs seated in housings at the ends of the bracket 5, said springs bearing against the horizontal flange of the bar 4 so as to hold the same up against the underside of the spring plank.

The construction above described permits a limited amount of movement vertically of the ends of the bar 4, such movement being sufficient to accommodate the necessary action of the brake beams when the brakes are applied. If it is desired to remove the brake beams, nut bolt 6—7 may be removed, which will enable the withdrawal of bar 4. The space in the bracket 5 which will enable the vertical play of bar 4 therein, is sufficient to accommodate the angle or bend of the bar in its insertion and removal. Bolt 6 must, of course, be removed to permit this longitudinal movement.

In Fig. 5, I have shown another form of my invention in which I dispense with the bracket 5 above described, and in lieu thereof employ bolts 9 which pass through enlarged openings in the horizontal flange of bar 4, whereby longitudinal displacement of the bar is prevented. These bolts 9 carry washers or spring seats 10 at their lower ends on which are arranged springs 11, said springs bearing against the underside of the horizontal flange of the bar 4. The operation of this construction is the same as that described with respect to Figs. 1 to 4.

In Figs. 7 and 8, I have shown another form of my invention in which there are two bolts 12 passing through enlarged openings of the horizontal flange of the bar 4. These bolts support a tie bar 13 to the center of which is secured a leaf spring 14 whose free ends are formed with enlarged openings, or are slotted, to receive the bolts 12, and bear against the underside of the horizontal flange of bar 4. The operation of this construction is similar to those heretofore described.

In Figs. 9 and 10, I have shown a construction in which bar 4 is divided at its center into two parts 4ª each being pivoted at 15 to brackets 16 secured to the plank. The ends of these sections 4ª have enlarged openings formed therein to coöperate with bolts 17. 18 are springs interposed between the inner ends of the sections 4ª and the underside of the spring plank. In this construction, the sections 4ª of the bar are independently movable.

What I claim is:

1. In a safety hanger, or third or fourth point support for brake beams, the combination with a part of a car truck, of a non-flexible bar mounted thereon, and means for permitting yielding movement of said bar.

2. In a safety hanger, or third or fourth point support for brake beams, the combination of a part of a car truck, a rigid bar arranged thereon, means for preventing longitudinal movement of said bar to permit a rocking movement thereof, and yielding means coöperating with the bar for holding it in normal position.

3. In a safety hanger, or third or fourth point support for brake beams, the combination of a part of a car truck, a bar mounted thereon and having a pivotal or rocking movement relative thereto, and yielding means coöperating with the said bar to hold the same in normal position.

4. In a safety hanger, or third or fourth point support for brake beams, the combination of a part of a car truck, a bar mounted thereon and capable of rocking movement relative thereto, means for preventing longitudinal movement of said bar, said means being detachable so as to permit the removal of the bar, and yielding means coöperating with said bar to hold the same in normal position.

In testimony whereof I hereunto affix my signature in the presence of two witnesses, this 7th day of July, 1916.

CHARLES HAINES WILLIAMS.

Witnesses:
 E. T. WALKER,
 M. F. HUNTOON.